United States Patent
Tang et al.

(10) Patent No.: US 7,788,400 B2
(45) Date of Patent: Aug. 31, 2010

(54) UTILIZING PROXIMITY INFORMATION IN AN OVERLAY NETWORK

(75) Inventors: Chungtang Tang, Rochester, NY (US); Zhichen Xu, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2032 days.

(21) Appl. No.: 10/666,621

(22) Filed: Sep. 19, 2003

(65) Prior Publication Data

US 2005/0076137 A1    Apr. 7, 2005

(51) Int. Cl.
 *G06F 15/173*    (2006.01)
(52) U.S. Cl. .................................................. 709/238
(58) Field of Classification Search ................ 709/238, 709/223

See application file for complete search history.

(56) References Cited

U.S. PATENT DOCUMENTS

| | | | | |
|---|---|---|---|---|
| 6,862,500 B2* | 3/2005 | Tzamaloukas | ................. | 701/1 |
| 6,925,378 B2* | 8/2005 | Tzamaloukas | .............. | 701/200 |
| 6,980,524 B1* | 12/2005 | Lu et al. | .................... | 370/254 |
| 6,985,928 B2* | 1/2006 | Zhang et al. | ................ | 709/213 |
| 7,076,365 B2* | 7/2006 | Tzamaloukas | .............. | 701/217 |
| 7,080,157 B2* | 7/2006 | McCanne | ................... | 709/238 |
| 7,133,928 B2* | 11/2006 | McCanne | ................... | 709/238 |
| 7,188,026 B2* | 3/2007 | Tzamaloukas | .............. | 701/200 |
| 7,266,082 B2* | 9/2007 | Xu et al. | ..................... | 370/238 |
| 7,266,125 B2* | 9/2007 | Xu et al. | ..................... | 370/401 |
| 7,289,520 B2* | 10/2007 | Xu et al. | ..................... | 370/400 |
| 7,379,428 B2* | 5/2008 | Xu et al. | ..................... | 370/254 |
| 7,433,316 B2* | 10/2008 | Xu et al. | ..................... | 370/238 |
| 7,454,520 B2* | 11/2008 | Zhang et al. | ................ | 709/238 |
| 7,554,988 B2* | 6/2009 | Zhang et al. | ........... | 370/395.31 |
| 7,555,553 B2* | 6/2009 | Zhang et al. | ................ | 709/226 |
| 7,613,796 B2* | 11/2009 | Harvey et al. | ............... | 709/220 |
| 2004/0010616 A1* | 1/2004 | McCanne | ................... | 709/238 |
| 2004/0054807 A1* | 3/2004 | Harvey et al. | ............... | 709/243 |
| 2004/0098503 A1* | 5/2004 | Zhang et al. | ................ | 709/238 |

OTHER PUBLICATIONS

Asano, T. et al., "Space Filling Curves and Their Use in the Design of Geometric Data Structures", Theoretical Computer Science, 181:(1), p. 3-15.
Bolosky, W. et al., "Feasibility of a Serverless Distributed File System Deployed on an Existing Set of Desktop PCs" Jun. 2000.
Castro, M. et al., "Exploiting Network Proximity in Peer-to-Peer Overlay Networks", Jun. 2002.
Dabek, F. et al.,"Wide-area Cooperative Storage with CFS", Oct. 2001.
Ng, T.S., et al., "Towards Global Network Positioning", ACM SIGCOMM Internet Measurement Workshop 2001.
Francis, P. et al., "An Architecture for a Global Internet Host Distance Estimation Service", IEEE Infocom 1999, p. 210-217.

(Continued)

*Primary Examiner*—Douglas B Blair

(57) ABSTRACT

An overlay network is used to logically represent an underlying physical network. A map associated with a region of the overlay network includes location information for nodes physically close in the physical network. The map is used to select a closest node in the physical network.

21 Claims, 11 Drawing Sheets

OTHER PUBLICATIONS

Karp, B. et al., "GPSR: Greedy Perimeter Stateless Routing for Wireless Networks", Proceedings of ACM Conf. on Mobile Computing and Networking (MOBICOM), 2000.

Kubiatowicz, J. et al., "Oceanstore: An Architecture for Global-scale Persistent Storage", Proceedings of ASPLOS 2000.

Li, J. et al., "A Scalable Location Service for Geographic Ad-hoc Routing", Proceedings of ACM Conf. on Mobile Computing and Networking (MOBICOM), 2000.

Medina, A. et al., "BRITE: Universal Topology Generation from a User's Perspecitve", Technical Report BUCS-TR-2001.

Ratnasamy, S. et al., "A Scalable Content-Addressable Network", SIGCOMM Aug. 2001.

Ratnasamy, S. et al., "Topologically-Aware Overlay Construction and Server Selection", IEEE Infocom 2002.

Rowstron, A. et al., "Storage Managment and Caching in PAST, a Large-Scale, Persistent Peer-to-Peer Storage Utility", SOSP 2001.

Savage, S. et al., "The End-to-End Effects of Internet Path Selection", ACM SIGCOMM Aug. 1999.

Stoica, I. et al., "A Scalable Peer-to-Peer Lookup Service for Internet Applications", SIGCOMM Aug. 2001.

Tang, C. et al., "PeerSearch: Efficient Information Retrieval in Peer-to-Peer Networks", HotNets 2002.

Waldvogel, M. et al., "Efficient Topology-Aware Overlay Network", HotNets 2002.

Zegura, E. et al., "How to Model an INternetwork" IEEE Infocom 1996.

Xu, Z. et al., "Building Low-maintenance Expressways for P2P Systems", 2001 Hewlett-Packard Labs: Palo Alto.

Xu, Z. et al., "Turning Heterogeneity to an Advantage in Overlay Routing", Jul. 2002.

Zhang, Z. et al. "Self-Balanced Expressway: When Marxism Meets Confucian", Technical report MSR-TR-2002-72.

* cited by examiner

UTILIZING PROXIMITY INFORMATION IN AN OVERLAY NETWORK

TECHNICAL FIELD

This invention relates generally to network systems. More particularly, the invention relates to using proximity information in overlay networks.

BACKGROUND

Recently, distributed hash table (DHT) overlay networks have been used to solve the problem of data placement and retrieval in large scale, Internet-sized storage systems. These systems generally include distributed network systems implemented, for example, using peer-to-peer (P2P) networks for storing vast amounts of data. The overlay networks are logical representations of the underlying physical networks, which provide, among other types of functionality, data placement, information retrieval, routing, etc. Some examples of DHT overlay networks include content-addressable-network (CAN), PASTRY, and CHORD.

Data is represented in an overlay network as a (key, value) pair, such as (K1, V1). K1 is deterministically mapped to a point P in the overlay network using a hash function, e.g., P=h(K1). The key value pair (K1, V1) is then stored at the point P in the overlay network, i.e., at the node owning the zone where point P lies. The same hash function is used to retrieve data. The hash function is used to calculate the point P from K1. Then the data is retrieved from the point P. This is further illustrated with respect to the 2-dimensional CAN overlay network 900 shown in FIG. 9.

A CAN overlay network logically represents the underlying physical network using a d-dimensional Cartesian coordinate space on a d-torus. FIG. 9 illustrates a 2-dimensional [0,1]×[0,1] Cartesian coordinate space in the overlay network 900. The Cartesian space is partitioned into CAN zones 910-914 owned by nodes A-E, respectively. The nodes A-E each maintain a coordinate routing table that holds the IP address and virtual coordinate zone of each of its immediate neighbors. Two nodes are neighbors if their zones overlap along d-1 dimensions and abut along one dimension. For example, nodes B and D are neighbors, but nodes B and C are not neighbors because their zones 911 and 914 do not abut along one dimension. Each node in the overlay network 900 owns a zone. The coordinates for the zones 910-914 are shown.

Routing in the overlay network 900 is performed by routing to a destination node through neighboring nodes. Assume the node B is retrieving data from a point P in the zone 914 owned by the node C. Because the point P is not in the zone 911 or any of the neighboring zones of the node B, the request for data is routed through the neighboring zone 913 owned by the node D to the node C owning the zone 914 where point P lies to retrieve the data. Thus, a CAN message includes destination coordinates, such as the coordinates for the point P, determined using the hash function. Using the sources node's neighbor coordinate set, the source node routes the request by simple greedy forwarding to the neighbor with coordinates closest to the destination coordinates, such as shown in the path B-D-C.

Without considering proximity information about nodes, CAN and other types of overlay networks operate far less efficiently than what is optimally possible. For example, referring to the CAN overlay network 900, the node B may select the node D when routing to the point P, because node D's coordinates may be closer to the destination then node A's coordinates. However, the number of logical hops in the overlay network 900 may be much less than the number of network hops in the physical network when routing to the destination node. For example, there may be 100 network hops in the path B-D-C and 50 network hops in the path B-A-C. Thus, by not considering the underlying network topology and selecting the path with more network hops, more network traffic is generated and latencies are increased.

SUMMARY OF THE EMBODIMENTS OF THE INVENTION

According to an embodiment, a method of identifying a close-by node in a region of an overlay network is provided, wherein the overlay network is a logical representation of a physical network. The method includes determining first proximity information associated with a location of a first node in the physical network, and searching through a map associated with a region of the overlay network using the first proximity information. The map includes proximity information associated with locations of nodes physically close in the physical network. The method further includes identifying a routing node in the region of the overlay network based on searching through the map, wherein the routing node is a node in the region physically closest to the first node in the physical network relative to other nodes in the region.

According to another embodiment, a method of identifying a node in a region of an overlay network includes determining first proximity information associated with a location of a source node in the physical network; searching through a map associated with a target region of the overlay network using the first proximity information, wherein the map includes proximity information associated with locations of nodes physically close in the physical network; and identifying a subset of nodes in the target region closest to the first node in the physical network based on searching through the map.

According to yet another embodiment, a system includes nodes connected via a network. Proximity information associated with physical locations of the nodes physically close in the system is stored at a group of the nodes logically close in an overlay network for the system.

According to yet another embodiment, a node in an overlay network includes means for determining first proximity information associated with a location of the node in the network. The node further includes means for searching through a map associated with a region of the overlay network using the first proximity information, wherein the map includes proximity information associated with locations of other nodes physically close in the physical network. The node further includes means for identifying a routing node in the region of the overlay network based on searching through the map, wherein the routing node is a node in the region physically closest to the node relative to other nodes in the region.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF THE EMBODIMENTS OF THE INVENTION

Figure 1:
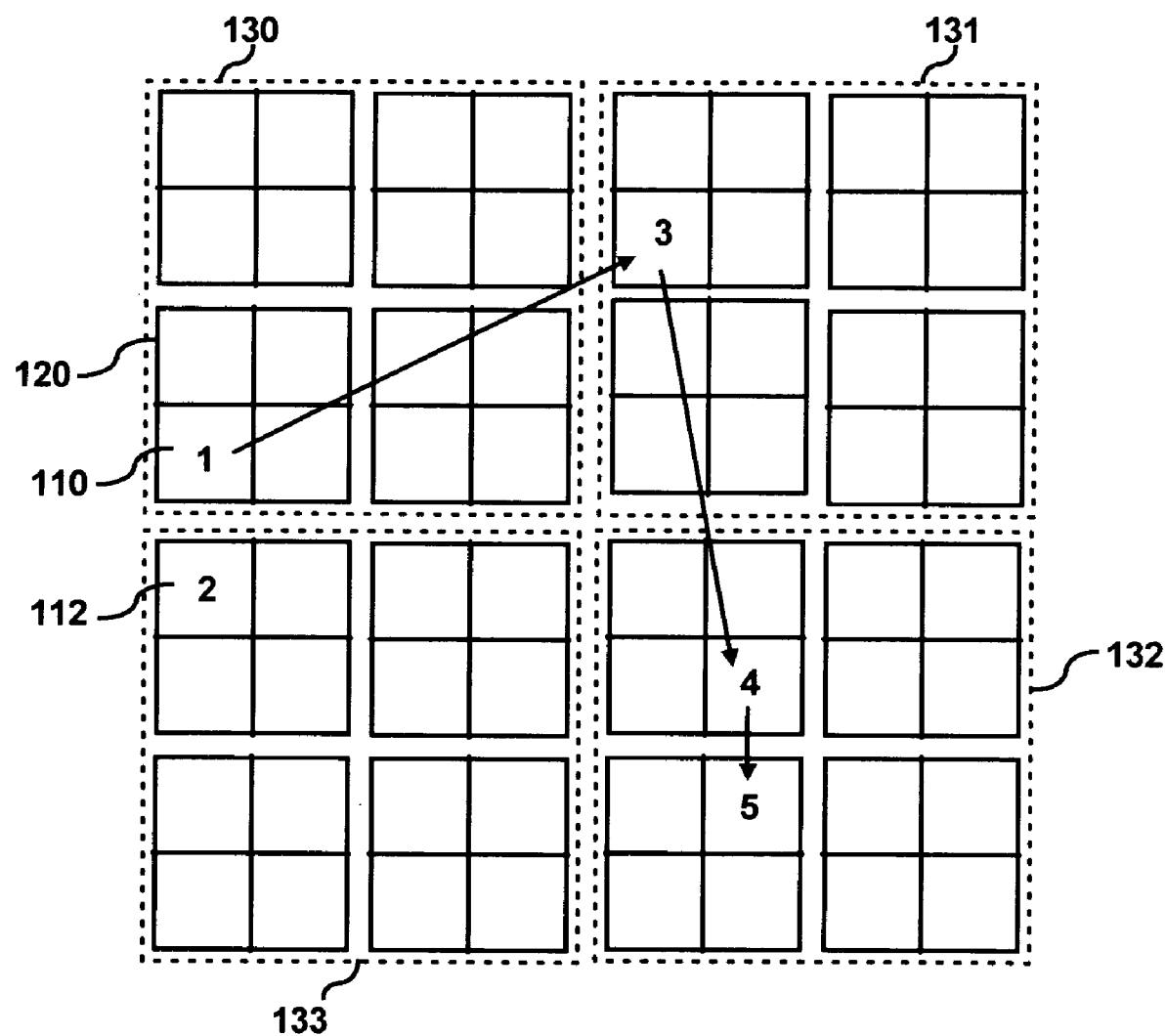
FIG. 1 illustrates an overlay network, according to an embodiment of the invention.

For simplicity and illustrative purposes, the principles of the embodiments of the invention are described. However, one of ordinary skill in the art would readily recognize that the same principles are equally applicable to, and can be implemented in, all types of network systems, and that any such variations do not depart from the true spirit and scope of the embodiments of the invention. Moreover, in the following detailed description, references are made to the accompanying figures, which illustrate specific embodiments. Electrical, mechanical, logical and structural changes may be made to the embodiments without departing from the spirit and scope of the embodiments of the invention.

Proximity information is used in an overlay network for routing. The proximity information is information related to the location of nodes in the underlying physical network for the overlay network. The proximity information may be generated by measuring distances to landmark nodes. Distance may be measured in terms of a network metric, such a round-trip-time (RTT), network hops, etc.

According to an embodiment, the proximity information and distance measurements for a subset of the closest nodes in a target region may be used to find the closest node in a region for routing. In expressway routing CAN (called eCAN which is a hierarchical version of CAN), according to an embodiment of the invention a physically closest node in a target region may be selected for routing to the region. The target region is a region of interest to a node. The region of interest may include a neighboring region or another region in the network. The closest node in the target region is determined by using the proximity information for the target region to find a predetermined number of the closest nodes (e.g., the top 30 closest nodes). Then, distance measurements are performed to each of the subset of nodes to find the closest node in the subset.

According to an embodiment, the placement of proximity information in the overlay network is controlled such that proximity information about nodes that are physically close to each other in the physical network is stored logically close in the overlay network.

According to another embodiment, a node subscribes to proximity information for neighboring regions. As the proximity information changes, for example due to nodes joining or leaving a region of the overlay network, the node gets notified of the updated proximity information.

According to an embodiment, a publish/subscribe functionality is provided in the overlay network. A node may specify an interest in another node or region in the overlay network by specifying a predetermined network condition to the node. The network condition is monitored at the node. If the network condition occurs, the node sends notification regarding the occurrence of the network condition. The notification may include network metrics measured by the node and a map for the region. The proximity information maintained in the overlay network may be used to identify a region or node of interest and to receive notification of the network condition. Also, information in the notification may be used to monitor the node and/or region of the node and to select a routing node in the region. Based on these embodiments, a topology aware overlay network is implemented that may reduce network traffic and latencies and that can respond to network condition changes in a demand-driven fashion.

FIG. 1 illustrates an eCAN overlay network 100, according to an embodiment of the invention. The eCAN network is shown by way of example, and not limitation. It will be apparent to one of ordinary skill in the art that the principles of the embodiments of the invention may be practiced in other types of overlay networks, such as CAN, PASTRY CHORD, etc.

The eCAN overlay network 100 augments the principles of a CAN overlay network. The eCAN overlay network 100 augments CAN's routing capacity with routing tables of larger span to improve routing performance. For example, default CAN zones are represented in the eCAN overlay network 100. Each CAN zone, such as the zone 110, is 1/64 of the entire Cartesian coordinate space of the eCAN overlay network 100. The CAN zones are order-I zones. The eCAN overlay network 100 also represents high-order zones that comprise multiple CAN zones. For example, an order-2 eCAN zone includes four neighboring CAN zones, such as the order-2 eCAN zone 120. Other high-order eCAN zones may also be represented, such as an order-3 eCAN zone that may include four order-2 eCAN zones. Zones 130-133 are order-3 eCAN zones.

A node that is an owner of a CAN zone is also a member of a high-order zone that encompasses the CAN zone. For example, node 1 is the owner of the CAN zone 110. Node 1 is also a member of the high-order zones 120 and 130 that encompass the CAN zone 110. In CAN, a node's routing table includes nodes in neighboring zones. In eCAN, a node's routing table includes the default CAN routing table and in addition routing information for high-order routing neighbors that are representative of its neighbors in the high-order zones. For example, node 1 may include node 2 in its routing table based on CAN routing procedure, because node 2 is in a neighboring order-I zone 1112. The routing table for node 1 may also includes node 3, because node 3 is in the neighboring order-3 zone 131.

The eCAN overlay network 100 also uses expressway routing nodes for expressway routing. Nodes with good connectivity and availability elect themselves as expressway routing nodes and publish that information to other nodes in the overlay network. For example, nodes 3 and 4 may be expressway routing nodes in the eCAN overlay network 100. An example of a routing path in the eCAN overlay network 100 is shown. If node 1 desires to transmit a message to node 5, a destination node, the path may include nodes 3, 4, and 5. In a CAN overlay network, the message is transmitted to a node in each neighboring CAN zone before reaching the destination node. Thus, the eCAN overlay network 100 may significantly reduce network traffic and latency by representing high-order zones and using expressway routing nodes. The eCAN overlay network is further described in U.S. patent application Ser. No. 10/231,184, entitled, "Expressway Routing Among Peers", filed on Aug. 29, 2002 and hereby incorporated by reference in its entirety.

According to an embodiment, landmark nodes are used to generate proximity information for regions in the overlay network. A region may include a portion of the overlay network. For example, in the eCAN overlay network 100, a region may include a portion of the Cartesian space, such as a high-order zone. Each of the order-3 zones, including the zones 130-133, may be a region. In a PASTRY overlay network, a region may include sharing a particular prefix.

For each region, a map is constructed. The map includes proximity information stored in the region, and the map is stored in each of the nodes in the region. When such maps are available, any node can find its physically closest neighbor in a neighbor region by consulting the map of the neighboring region.

Proximity information is information related to the location of nodes in the underlying physical network for the overlay network. According to an embodiment, proximity information is determined using landmark nodes and determining distances to the landmark nodes. Distance may be measured in terms of a metric, such as network hops, round trip tine (RTT) for a message to travel from the source node to a landmark node and back, etc. RTT is used in the description below by way of example, and not limitation.

Figure 2A:
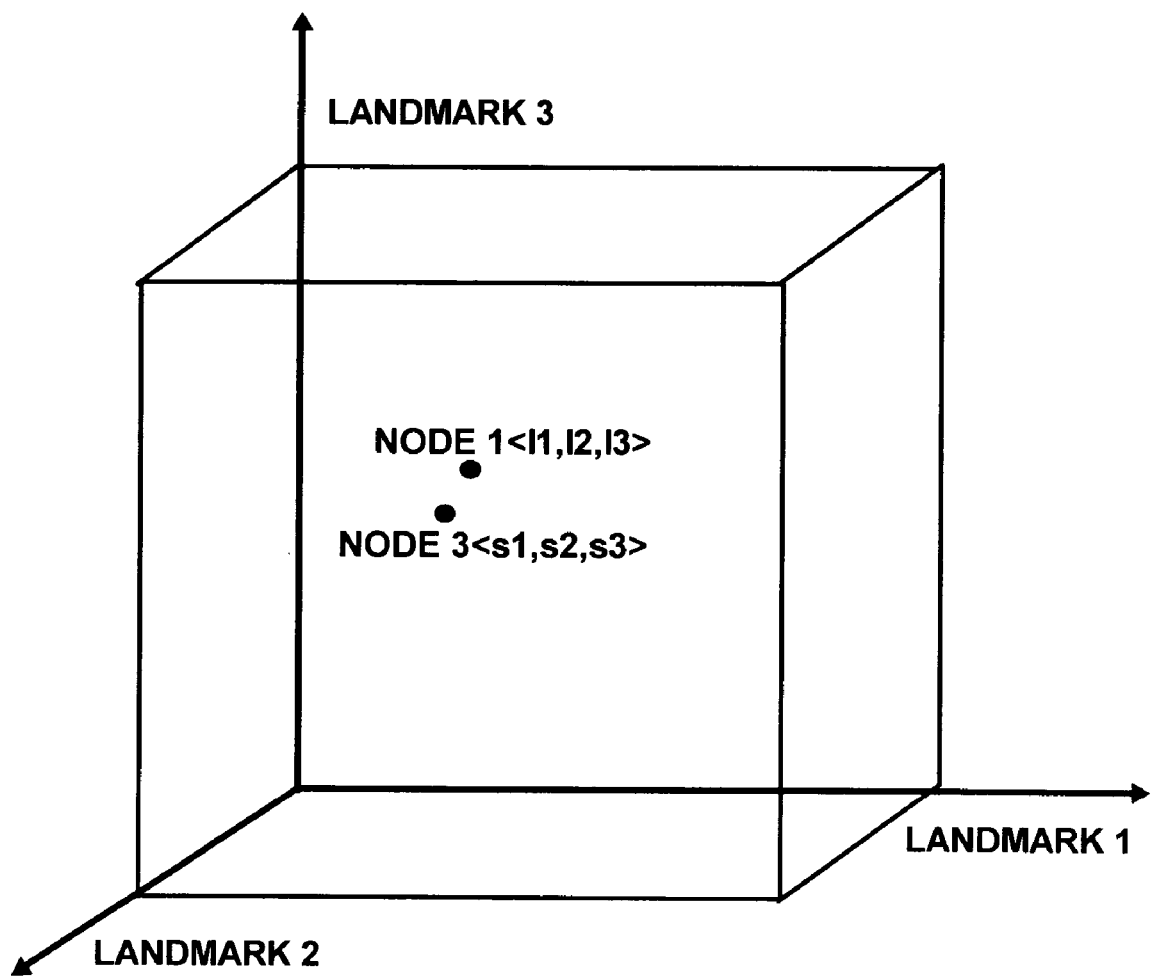
FIG. 2A illustrates nodes in a landmark space, according to an embodiment of the invention.

According to an embodiment, a node's location in the physical network is represented using a landmark space. A landmark space is a logical representation of the physical network in a coordinate space, similar to the overlay network. FIG. 2A illustrates a landmark space 200, according to an embodiment of the invention. A number of nodes n in the physical network are randomly selected. These are the landmark nodes. The number of dimensions of the Cartesian landmark space 200 is equal to the number of landmark nodes. The landmark space 200 is three dimensional, assuming three landmark nodes were selected.

Each node in the overlay network measures its distance to the n landmark nodes. A landmark vector with n elements is generated for each node, wherein each element is a distance to one of the landmark nodes. Referring to FIG. 2A, landmark vectors for the nodes 1 and 3 from FIG. 1 are shown in the landmark space 200 of FIG. 2A. The landmark vector for node 1 is shown as <l1, l2, and l3 >, where l1-l3 represent distances to the landmark nodes, and the landmark vector for node 3 is shown as <s1, s2, and s3>, where s1-s3 represent distances to the landmark nodes. The nodes 1 and 3 are positioned in the landmark space at the coordinates provided in their landmark vectors. Thus, nodes close to each other in the landmark space 200 are close in the physical network.

When determining the number of landmark nodes to be used for determining location information for the nodes in the overlay network, a sufficient number of landmark nodes may be used to reduce the probability of false clustering where nodes that are far away in network distance tend to be clustered close to each other in the landmark space. As a result, the number of dimensions of the landmark space is typically higher than the number of dimensions for the overlay network. Thus, a hash function is used to translate physical node location information (e.g., landmark vectors) from the landmark space to the overlay network, such that points close in the landmark space are mapped to points that are close in the overlay network.

Figure 2B:
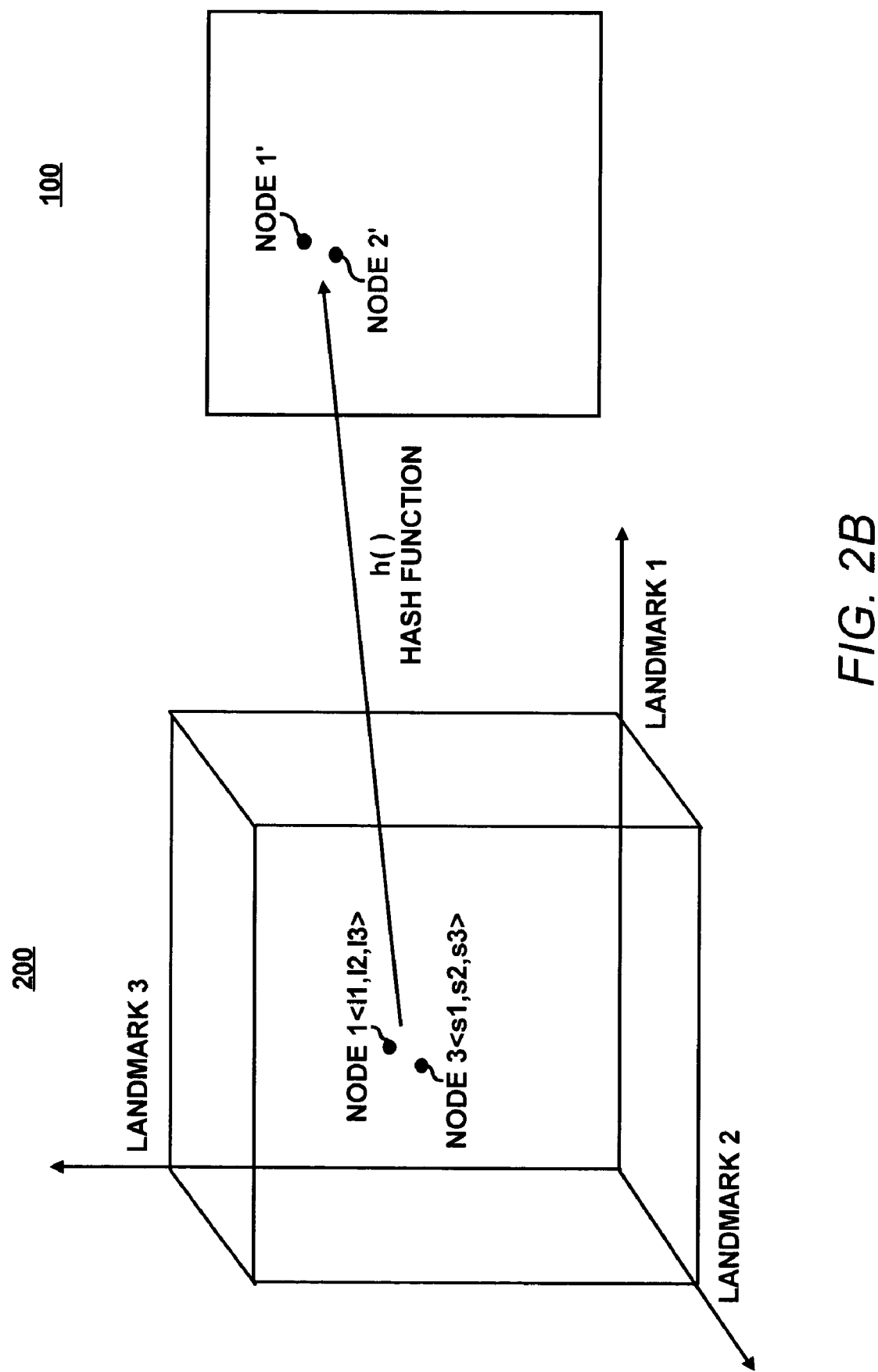
FIG. 2B illustrates storing proximity information in locations in the overlay network, according to an embodiment of the invention.

The hash function is used to determine a point p' in the overlay network that corresponds to a point p in the landmark space. The hash function is represented as $p' = h(p, dp, dz, z)$, where dp is the dimension of p (p being a point in the landmark space, such as shown for nodes 1 and 3 in the landmark space 200), z is the region where the proximity information is about to be stored (e.g., zone 131 shown in FIG. 1), dz is the dimension of the region z (e.g., 2 for the overlay network 100 shown in FIG. 1), and p' is a point in the region z. If the points for the nodes 1 and 3 in the landmark space 200 are close, the p' points for the nodes 1 and 3 in the overlay network are also close in the region z. Thus, the map for the region z includes proximity information for the nodes 1 and 3. For example, node 1' is the point in the eCAN overlay network 100 for node 1 associated with the point for node 1 in the landmark space 200 shown in FIG. 2A. Proximity information for the node 1 is stored at the node in the eCAN overlay network 100 that owns the zone where the point node 1'is located. The proximity information stored at that node may include the triple <z,n,p>, where z is the region, n is the node 1 (e.g., node 1D), and p is the landmark vector for node 1 in the landmark space 200. FIG. 2B illustrates the proximity information for the nodes 1 and 3 being stored in the eCAN overlay network 100. A high-level representation of the eCAN overlay network 100 is shown in FIG. 2B. Note that the proximity information for nodes 1 and 3, such as stored at the points node 1' and node 3', is closely located in the eCAN overlay network 100 similarly to the close physical locations represented in the landmark space 200. The controlled placement of the proximity information in the overlay network, according to the embodiments of the invention, allows the map for a region to be stored in a fraction of the region it covers (e.g., the map is stored in each node in the region which owns a fraction of the region), especially when a region is a high-order zone. The ratio of map size to the size of the hosting zone storing the map is the condense rate of the coordinate map. Because of the condense rate, a large amount of proximity information may be discerned from a single node. Therefore, the amount of map lookup requests that need to be performed may be reduced.

As described above, a hash function is used to determine a point p' in the lower dimension overlay network that corresponds to a point p in the higher dimension landmark space. The hash function may use a space-filling curve to map points from a higher dimension space into a lower dimension space. If two points are close to each other in the higher dimensional space, the points are mapped to two points close to each other in the lower dimensional space using the space-filling curve. One example of well known recursive space-filling curve is the Hilbert curve, which may be used for the hash function.

Figures 3A, 3B:
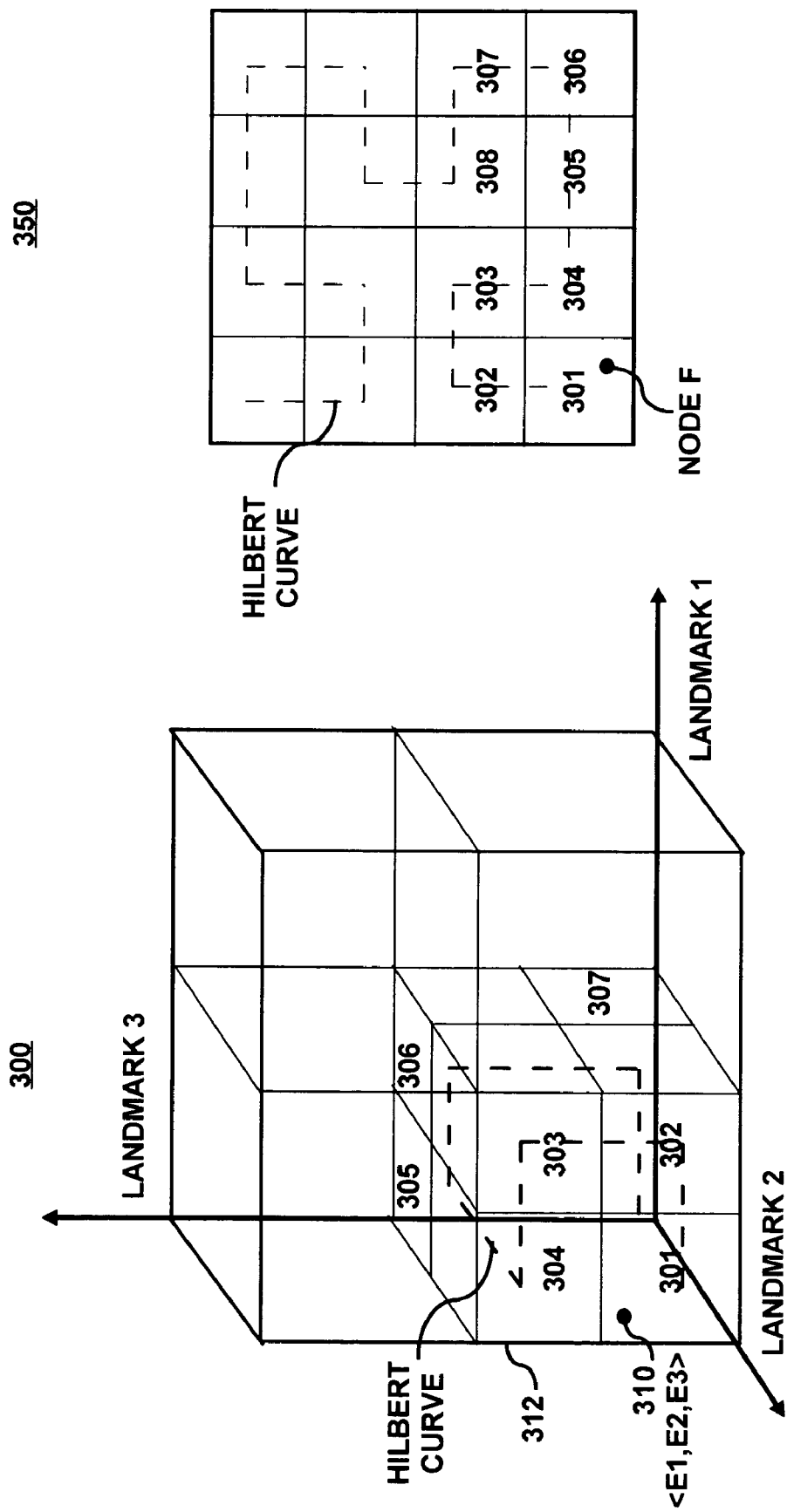
FIGS. 3A-B illustrate mapping points from a landmark space to an overlay network using a space filling curve, according to an embodiment of the invention.

Use of landmark numbers and the hash function is further described with respect to FIGS. 3A-B. FIGS. 3A-B illustrate using a Hilbert space filling curve to map landmark numbers in a three-dimensional landmark space 300 into a two-dimensional overlay network. The landmark space 300 is divided into $2^{nx}$ grids of equal size (such as shown for section 312 of the landmark space 300), where n refers to the number of landmark nodes in the landmark space 300 and x controls the number of grids used to partition the landmark space 300. Each grid is assigned a landmark number (e.g., landmark numbers 301-308), and each node located in section 312, which may include expressway routing nodes for eCAN, is numbered according to the grid into which it falls. The landmark numbers can be used as keys to identify locations of nodes in the overlay network storing proximity information by hashing the keys. The entire landmark vector or a subset of the entire landmark vector, called a landmark vector index, may be used to determine which grid of the landmark space 300 a node falls into (i.e., which landmark number is assigned to a node in the landmark space 300). Closeness in landmark numbers indicates physical closeness in the network. Also, the smaller the value of x, the larger the likelihood that two expressway routing nodes will have the same landmark number and the greater the accuracy of the physical proximity information.

A space filling curve, such as the Hilbert curve (although other known space filling curves may be used), is used to map the three-dimensional landmark space 300 to a region 350, shown in FIG. 3B, in a two-dimensional overlay network. For CAN or eCAN, the region 350 is partitioned into grids, again using the Hilbert space filling curve. FIG. 3B illustrates the landmark numbers 301-308 from the landmark space 300 mapped onto the grids in the region 350 of the overlay network. Proximity information about a node is stored in a grid depending on its landmark number. For example, a point 310 is shown in the grid for landmark number 301 in the landmark space 300 shown in FIG. 3A. Assume point 310 is the landmark vector for an expressway routing node E. Proximity information for the node E is stored at the node F, shown in FIG. 3B, which owns the zone in the region 350 where the grid for the landmark number 301 is located in the overlay network. The landmark number for node E (e.g., 301) may be used as a key to determine the node F in the region 350 that is used to store proximity information for the node E. In the case of CHORD, the landmark number may be used as a key to store the proximity information of an expressway routing node on a node whose ID is equal to or greater than the landmark number. In the case of PASTRY, a prefix of the node 1D is used to partition the logical space into grids.

Figure 4:
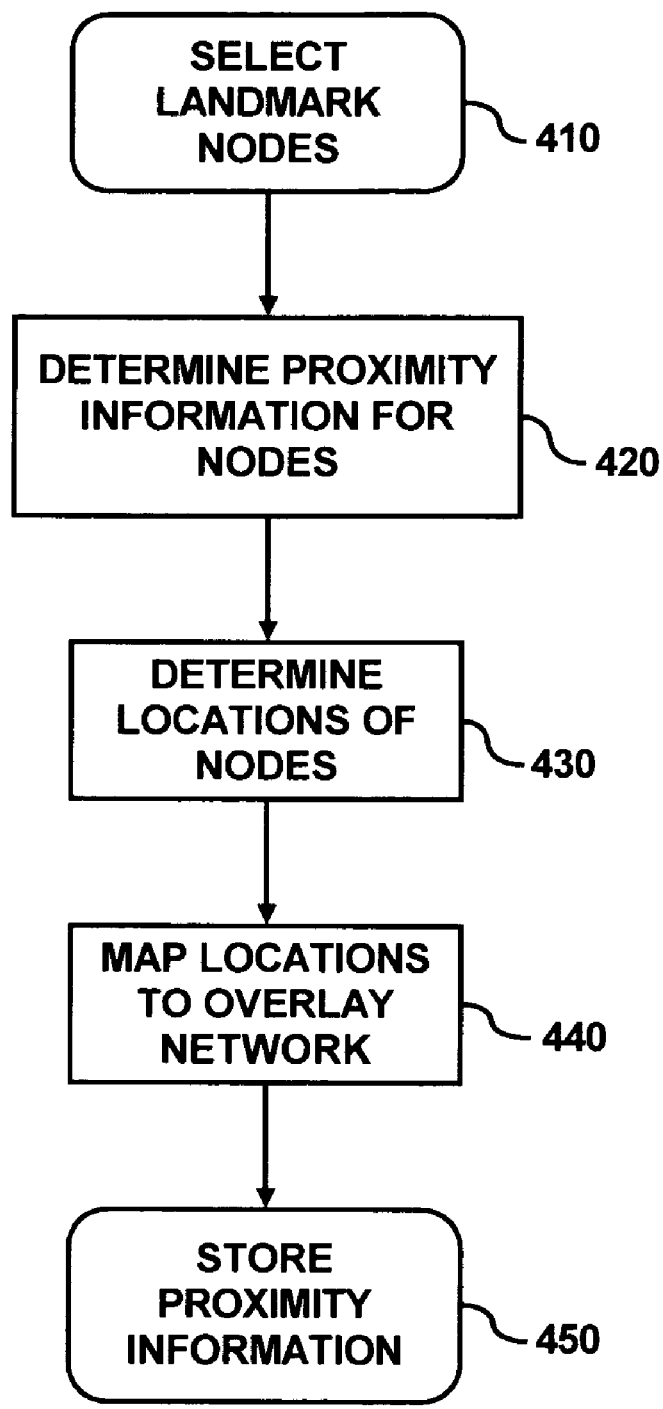
FIG. 4 illustrates a flow chart of a method for placing proximity information in an overlay network, according to an embodiment of the invention.

FIG. 4 illustrates a method 400 for placing proximity information in an overlay network, according to an embodiment of the invention. It should be readily apparent to those of ordinary skill in the art that the method 400 represents a generalized illustration and that other steps may be added or existing steps may be removed or modified. At step 410, landmark nodes are selected in the physical network. The number of landmark nodes selected is dependent on the size of the network. The larger the network, the greater the number of landmark nodes that should be selected to accurately determine physical location information for nodes in the network. The landmark nodes may be randomly selected from nodes in the overlay network or standalone nodes.

At step 420, proximity information for the nodes in the overlay network are determined. This may include measuring distances from nodes in the network to the landmark nodes. Distance from each node to each landmark node are measured based on a network metric, such as RTT, network hops, etc. For example, each node may determine an RTT to each landmark node and store this information as a landmark vector. At step 430, locations for the nodes in the physical network are determined based on the distances determined at step 420. The locations may include the landmark vectors determined for each node, such as described with respect to the landmark space 200 shown in FIG. 2A.

At step 440, the locations for the nodes determined at step 430 are mapped to the overlay network. This may include using a landmark vector or a landmark number of a node as a key to determine a location in the overlay network for storing the proximity information. A node may hash its key to a point P' in the overlay network using a hash function. In one embodiment, the hash function includes a space filling curve for mapping n-dimensional landmark vectors to an m-dimensional overlay network, where n>m.

At step 450 proximity information for the nodes are stored in the overlay network, such that proximity information for nodes physically close together are stored logically close together in the overlay network. For example, FIG. 2B illustrates landmark vectors for nodes 1 and 3 that are relatively close. FIG. 2B also illustrates storing proximity information for the nodes 1 and 3 relatively close in the overlay network 100. Also, a map is generated for each region in the overlay network including proximity information for the region. The map is stored at each node in the region.

After the proximity information is stored in the overlay network, for example, as maps for each region, the proximity information may be used for routing to the physically closest node, also referred to as a routing node. Thus, routing in the overlay network takes into consideration the topology of the underlying physical network, which may result in reduced network traffic and latency.

Figure 5A:
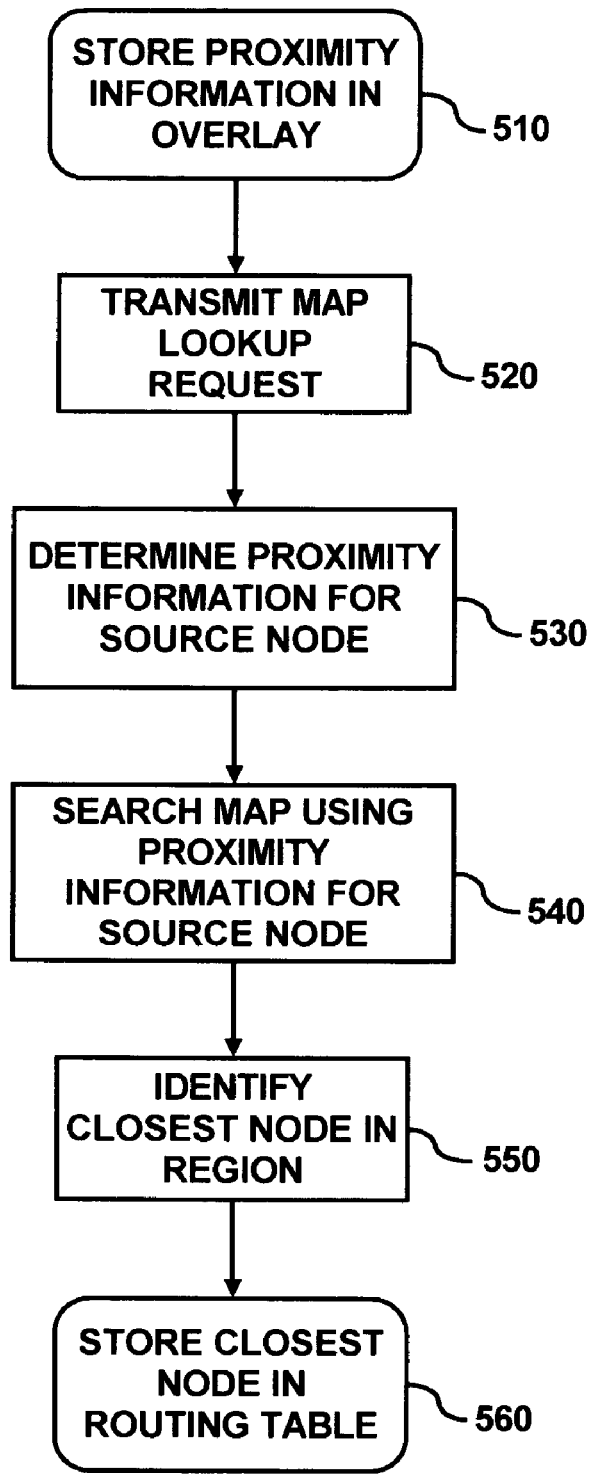
FIGS. 5A-B illustrate flow charts of methods for determining closest nodes, according to embodiments of the invention.

FIG. 5A illustrates a method 500, according to an embodiment of the invention, for determining a closest node. The method 500 is described with respect to FIG. 1, by way of example, and not limitation. Furthermore, it should be readily apparent to those of ordinary skill in the art that the method 500 represents a generalized illustration and that other steps may be added or existing steps may be removed or modified. At step 502, proximity information for the nodes is stored in the overlay network, such as described in the method 400.

Figure 2A:
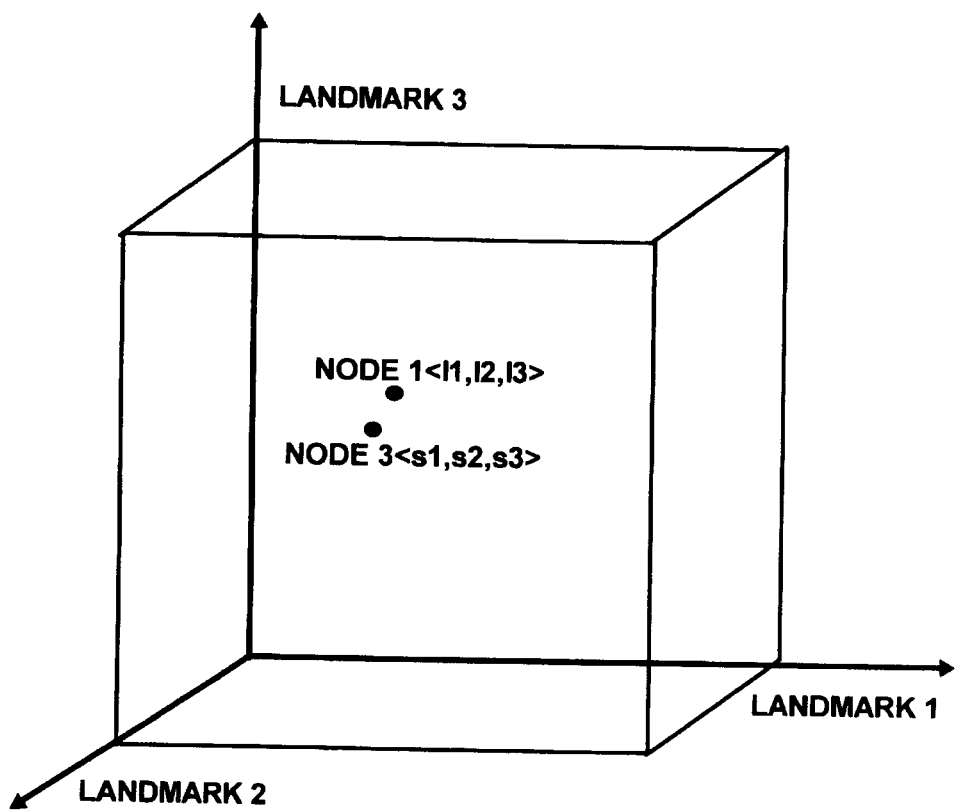

At step 504, a source node, which may include any node in the overlay network including an expressway routing node, transmits a map lookup request to a node in a region, which may include a neighboring region or other region. Referring to FIG. 1, assume node 1, e.g., the source node, is an expressway routing node in region 130, which is a high-order zone in the eCAN overlay network 100. Node 1 needs to route a message to the region 131, a neighboring region, to reach a destination node. Node 1 determines its landmark vector (e.g., node 1 <l1, l2, l3 >, shown in FIG. 2). Node 1 maps its landmark vector to a point node 1', for example, by hashing the landmark vector or landmark number for node 1 to determine the point node 1' in the overlay network. A map lookup request is transmitted to the node owning the zone where the point node 1' is located in the region (e.g., high order zone 131 shown in FIG. 1). The map for the high-order zone 131 is transmitted back to node 1.

At step 506, the source node determines its proximity information, such as the landmark vector for node 1. At step 508, the source node searches through the map for the region using its proximity information to find a node in the region physically closest to the source node (step 510). The source node may compare proximity information for each node in the map to proximity information for the source node to identify the physically closest node in the region to the source node. For example, the map may include triples <z, n, p> as proximity information for each node in the map, where z is the region, n is the node, and p is the landmark vector for the node. Node 1 indexes the map for the high-order zone 131 using its landmark vector to identify an expressway routing node physically closest to the node 1. The result of the indexing may include node 3 as an expressway routing node closest to the node 1 in the region or high-order zone 131.

At step 512, the physically closest node identified at step 510 is stored in the routing table for the region. For example, if node 3 is identified at step 512, node 1 stores node 3 in node's 1 routing table as the expressway routing node for the high-order zone 131. Thus, the expressway routing node 1 routes to the expressway routing node 3 to reach a destination node, which may be located in the high-order zone 131 or another high-order zone in the overlay network 100.

The method 500 may be performed for identifying expressway routing nodes in the neighboring regions. For example, the expressway routing node 1 in the high-order zone 130 shown in FIG. 1 performs the steps of the method 500 to identify expressway routing nodes in the neighboring high-order zones 131 and 133. The expressway routing nodes identified for the high-order zones 131 and 133 may then be used to route to the high order zoned 13'-133 from the expressway routing node 1.

Figure 5B:
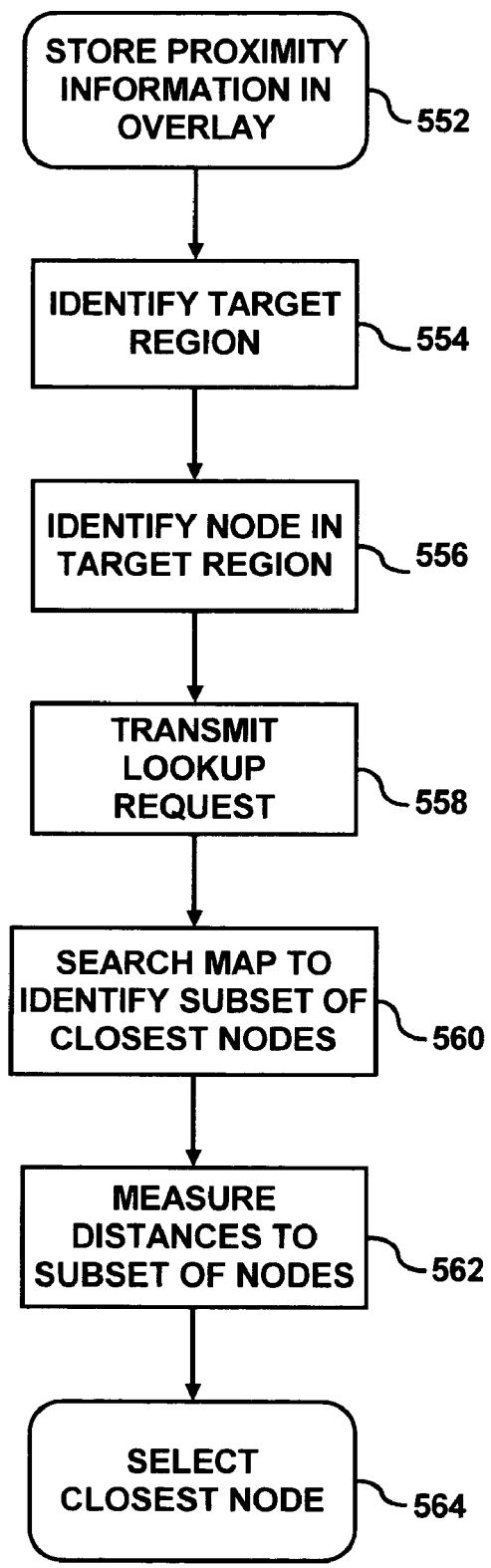

FIG. 5B illustrates a method 550, according to another embodiment of the invention, for determining a closest node. Furthermore, it should be readily apparent to those of ordinary skill in the art that the method 550 represents a generalized illustration and that other steps may be added or existing steps may be removed or modified. At step 552, proximity information for the nodes is stored in the overlay network, such as described in the method 400.

At step 554, a source node identifies a region of interest (i.e., a target region) in the overlay network. The region of interest may include a neighboring region or another region in the overlay network, such as a region including one or more nodes being monitored by the source node to determine network conditions of the one or more nodes.

At step 556, the source node identifies a node in the target region to transmit a lookup request, such as a map lookup request. In one embodiment, this may include hashing a landmark vector or number of a node in the target region. For example, referring to FIGS. 3A-B, the landmark number 310 for the node E is hashed to identify a location in the overlay network of the node storing information for the node E, such as the node F in the Cartesian space 350 of the overlay network.

At step 558, the source node transmits a map lookup request to the node identified at step 556. The map lookup request may include proximity information (e.g., the landmark vector) for the source node, which may be used to search the map of the target region.

At step 560, the map for the target region is searched using the proximity information for the source node to identify a subset of the nodes in the target that is physically closest to the source node in the physical network. The subset of nodes may include a predetermined number of nodes. For example, 30 nodes of the nodes in the target region that are physically closest to the source node are selected. The source node may compare proximity information for each node in the map to proximity information for the source node to identify the subset of physically closest nodes in the target region. For example, the map for the target region may include triples <z, n, p> as proximity information for each node in the map, where z is the region, n is the node, and p is the landmark vector for the node. The landmark vector for the source may be compared to each triple in the map for the target region to identify the subset of physically closest nodes.

The step 560 may be performed by the source node or the node in the target region. For example, the node in the target region nay receive the proximity for the source node in the map lookup request and search the map of the target region to determine the subset of physically closest nodes. The subset of physically closest nodes is then transmitted to the source node. Alternatively, the map may be transmitted to the source node, and the source node may determine the subset of physically closest nodes.

At step 562, a distance from the source node to each of the nodes in the subset of physically closest nodes in the target region is determined. Distance measurements are based on a network metric, such as RTT, network hops, etc.

At step 564, the source node selects a node in the subset that is physically closest to the source node based on the distance measurements. The physically closest node may be stored in routing table for the source node. For example, if the target region is a neighboring region, and the source node is an expressway routing node trying to identify another expressway routing node in the neighboring region, a physically closest expressway routing node is identified for the neighboring region and stored in the routing table for future routing of messages. The target region, however, is not limited to a neighboring region, and may include any region of interest.

The physical network is dynamic and as a result the overlay network is also dynamic. Nodes may be continually added (joined) or removed (departed) from a region in the overlay network. For example, in P2P file-sharing, storage systems, like MORPHEUS and NAPSTER, nodes or peers are continually joining and departing from the network. Because of the dynamic nature of the overlay network, a node may periodically check a neighboring region's map to see whether more favorable nodes are available, such as a node physically closer in the region than a previously identified routing node. Checking of a map may be performed in a demand-driven fashion, such as in response to predetermined network conditions occurring.

Also, a node may desire to monitor network conditions at a node of interest (i.e., a target node) and/or a region of interest (i.e., target region) in the overlay network, which may include a region where the target node is located. For example, to better balance network traffic based on each node's capacity and current load, a node may periodically publish these statistics along with its proximity information. A node receiving the published statistics, such as forwarding capacity and current load, may consider the statistics as well as distance to the node (i.e., closest physical node) when selecting a routing node in the target region. If a node is concerned with QoS, the node may subscribe not only to proximity information, such as a map of the region, but also to the statistics, specifying the conditions under which it should be notified, e.g., "the selected neighbor is handling 80% of its maximum load capacity". When such a condition occurs, a new routing node for the region may be selected based on received statistics or measured network metrics for a node in the target region and based on a map for the target region. The advantages of storing proximity information can be applied to many applications, such as information storage, load balancing, congestion control, meeting quality of service (QoS) guarantee, taking advantage of heterogeneity in storage capacity and forwarding capacity, etc.

Figure 6:
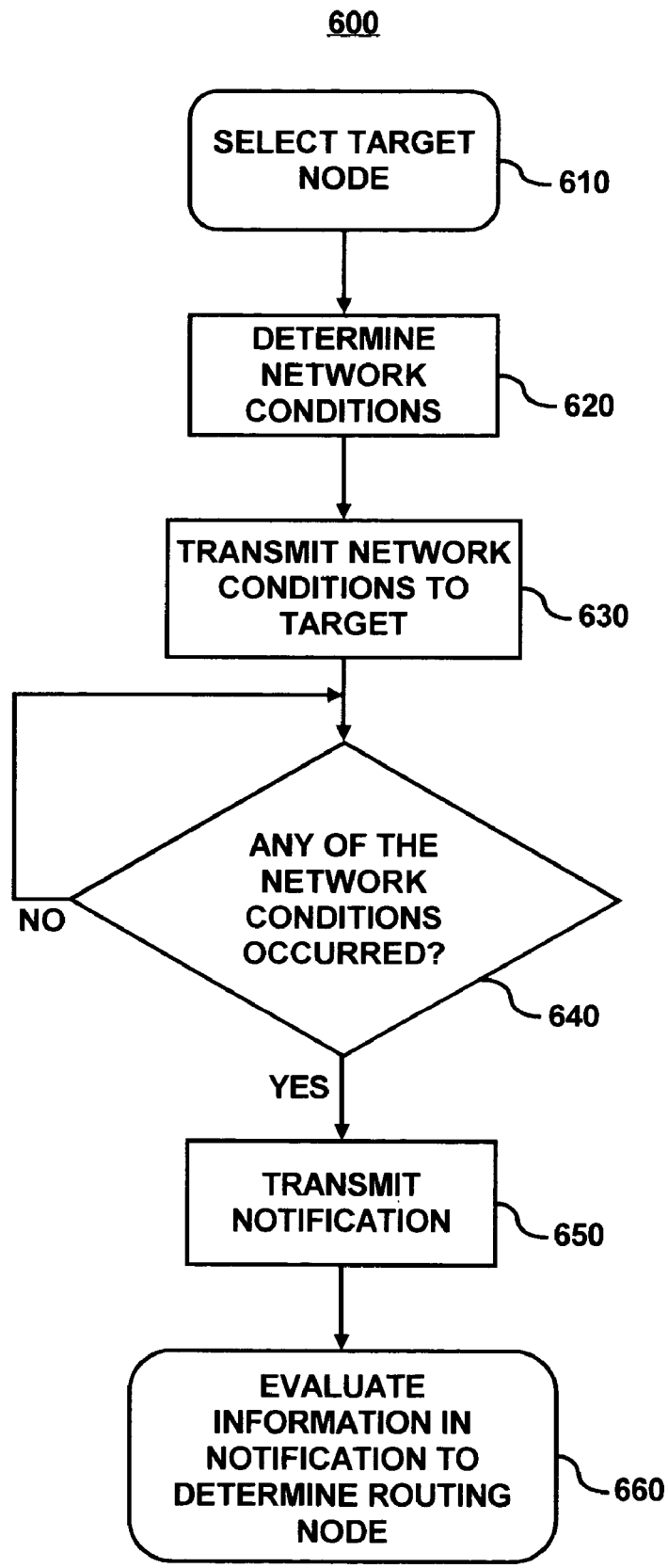
FIG. 6 illustrates a flow chart of a method for providing a notification in response to detecting a network condition, according to an embodiment of the invention.

FIG. 6 illustrates a method 600, according to an embodiment of the invention, for receiving notification if a network condition occurs in the overlay network. The method 600 is described with respect to FIG. 1, by way of example, and not limitation. Furthermore, it should be readily apparent to those of ordinary skill in the art that the method 600 represents a generalized illustration and that other steps may be added or existing steps may be removed or modified. At step 610, a node (referred to as the source node) selects a target node of interest. The target node may include a node in a neighboring region that is currently a routing node. For example, the expressway routing node 3 of FIG. 1 may have been selected by the expressway routing node 1 for routing to the region 131. The expressway routing node 1 may then desire to monitor the expressway routing node 3 to determine whether, for example, due to network changes, the expressway routing 3 becomes less optimal for routing to the region 131. Regions and nodes, other than neighboring regions and nodes in neighboring regions, may be selected as a target node or a target region of interest.

At step 620, the source node determines one or more network conditions that would invoke notification by the target node if the target node determines that any of the network conditions occurred. At step 630, the source node transmits the network conditions to the target node. At step 640, the target node determines whether any of the network conditions have occurred. For example, the expressway routing node 1 in FIG. 1 may desire to receive notifications of network metrics, e.g., current load, forwarding capacity, etc., for the expressway routing node 3. The expressway routing node 3 may continually measure the network metrics. If any of the network conditions occurred, the expressway routing node transmits the measured network metrics to the expressway routing node 1. The network conditions, for example, may include the load of the expressway routing node 3 being greater than a threshold or falling below a threshold, the forwarding capacity of the expressway routing node falling below a threshold, a predetermined number of nodes joining or departing from the region of the expressway routing node 3, lapse of a predetermined period of time (e.g., such that notifications of the measured networks are periodically transferred to the expressway routing node 1), etc.

At step 650, the target node transmits a notification to the source node if any of the network conditions occur. The notification may include one or more of the measured network metrics. The measured network metrics may be related to the network conditions or may include other network metrics. Examples of network metrics may include the load of the target node, the forward capacity of the target node, etc. The notification may also include a map for the target region. The map may be updated to reflect changes in proximity information due to joining and/or departing nodes. For example, if a predetermined number of nodes have joined or departed since an initial period in time, the map for the target region is updated to reflect the change in nodes in the target region. The map and/or the network metrics are transmitted to the source node, where they may be used by the source node to select a new routing node in the target region.

At step 660, the source node evaluates the information in the notification to determine whether a new routing needs to be selected. For example, if the notification from the target node indicates that the load is greater than a threshold or the forwarding capacity is below a threshold, the source node may select a new routing node for the target region. Also, if a predetermined number of nodes have joined or departed from the target region, the source node may re-identify a closest node in the target region using, for example, the methods 500 or 550. A new routing node if selected is placed in the routing table of the source node for routing to the target region.

The method 600 may be used by a plurality of source nodes, which may include nodes in different regions, to subscribe to a target node by specifying network conditions to the target node. If a network condition occurs, the target node publishes measured network metrics and a map of the target region to the subscribing source nodes. The source nodes may subscribe to multiple target nodes and can use the information published from the target nodes to select better routes in the overlay network.

The methods 400-600 are generally described above with respect to an eCAN overlay network. However, it will be apparent to one of ordinary skill in the art that the methods 400-600 are applicable to other types of overlay networks, such as CAN, PASTRY, CHORD, etc. The methods 500, 550, and 600 are not limited to monitoring neighboring regions and may be used to monitor regions or nodes in any part of the network. For example, the expressway routing node 1 of FIG. 1 may have an interest in the region 132, which is not a neighboring region. The expressway routing node 1 may use the steps of the method 500 or 550 to identify a closest node in the region 132. Also, the expressway routing node 1 may have an interest in the node 5 in the region 132. The expressway routing node 1 may use the steps of the method 600 to monitor network conditions for the node 5.

Figure 7:
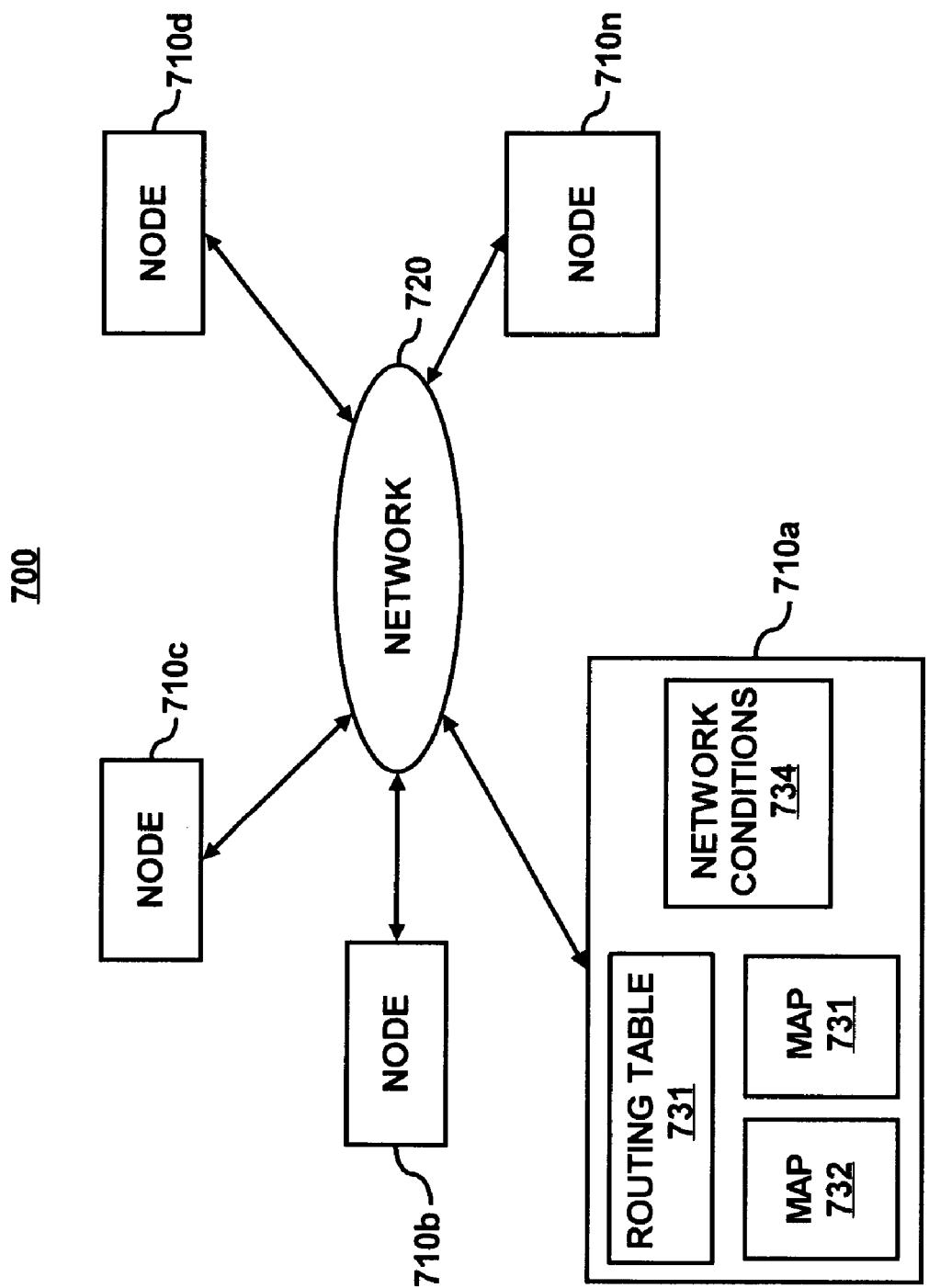
FIG. 7 illustrates an underlying physical network for an overlay network, according to an embodiment of the invention.

FIG. 7 illustrates a physical network 700, according to an embodiment of the invention, which may be used as the underlying physical network for an overlay network implementing one or more of the embodiments of the invention. It should be readily apparent to those of ordinary skill in the art that the network 700 represents a generalized schematic illustration and that other components may be added or existing components may be removed or modified without departing from the spirit or scope of the present invention.

The network 700 includes a plurality of nodes 710a . . . 710n functioning as peers in a P2P system. The nodes 710a . . . 710n may be operable to exchange information among themselves and with other network nodes over a network 720. The nodes 710a . . . 710n may also be operable to determine which nodes 710a . . . 710n are valid and perform other functions (object search and retrieval, object placement, etc.) of a peer in a P2P system. Objects may include files, URLs, etc. The nodes 710a . . . 710n may be computing platforms (e.g., personal digital assistants, laptop computers, workstations, servers, and other similar devices) that have a network interface. The nodes 710a . . . 0.71 On may be further operable to execute one or more software applications (not shown) that include the capability to share information (e.g., data, applications, etc.) in a P2P manner.

The network 720 may be operable to provide a communication channel among the nodes 710a . . . 710n. The network 720 may be implemented as a local area network, wide area network or combination thereof. The network 720 may implement wired protocols, such as Ethernet, token ring, etc., wireless protocols, such as Cellular Digital Packet Data, Mobitex, IEEE 801.11b, Bluetooth, Wireless Application Protocol, Global System for Mobiles, etc., or combination thereof.

Some of the information that may be stored in the nodes 710a . . . n is shown for node 710a. The node 710a stores a routing table 731, a map 732 for its region, and a map 733 for a neighboring region. The node 710a may use the map 733 to select a physically close node for routing to the neighboring region. The node 710a may also store network conditions 734. If any of the network conditions 734 occurs, for example, due to changes in the network 700, the node 710a updates the map 732 for its region and transmits the updated map and/or measured network metrics to another one of the nodes 710b . . . n monitoring the network conditions of the node 710a, such as described with respect to the method 600. The updated map 732 and/or the measured network metrics may be used to select a physically closer node for routing to the region of the node 710a. The network 700 is described as a P2P system, but the embodiments of the invention may be practiced in other types of networks, including distributed networks.

Figure 8:
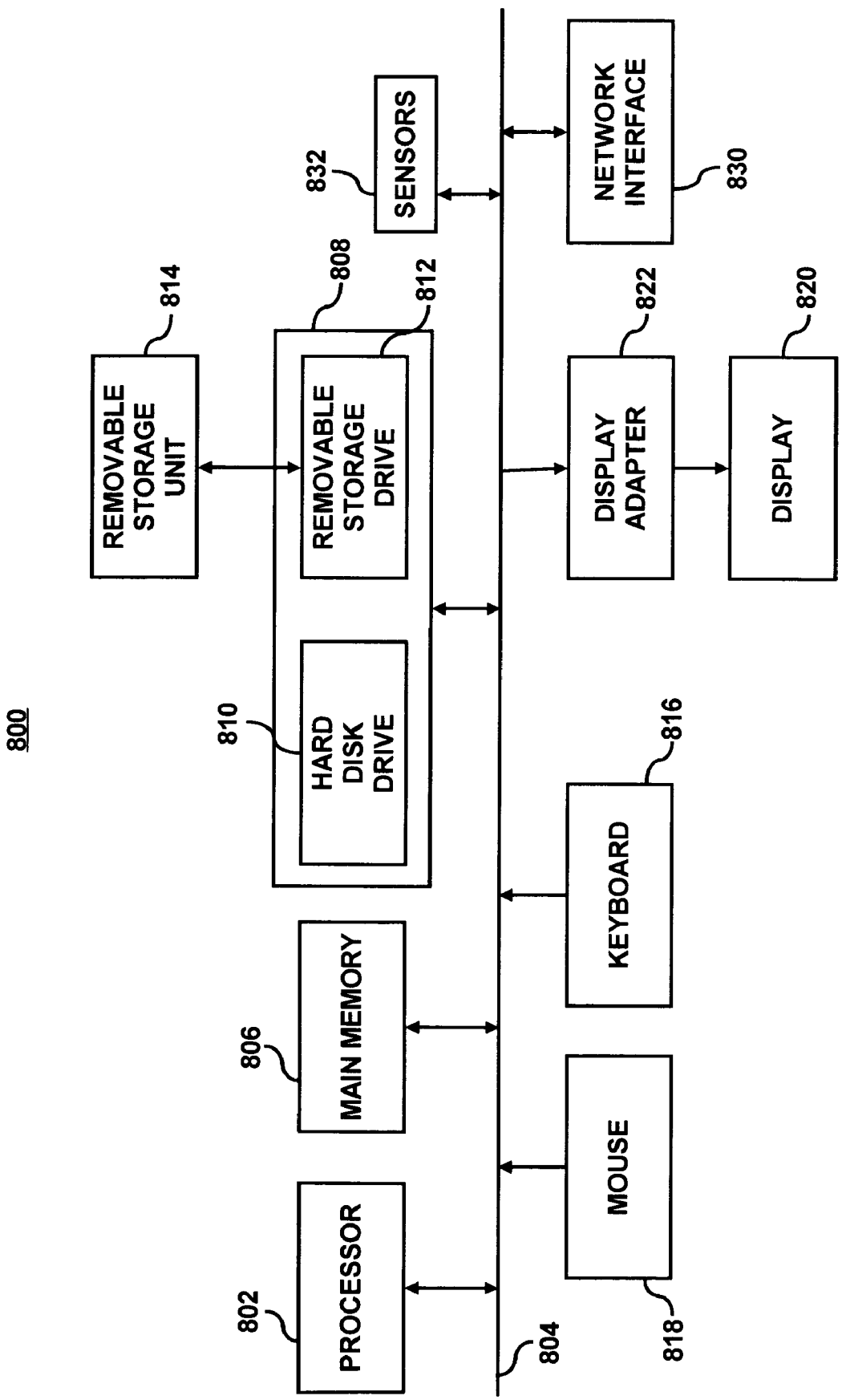
FIG. 8 illustrates a block diagram of a node, according to an embodiment of the invention.
Figure 9:
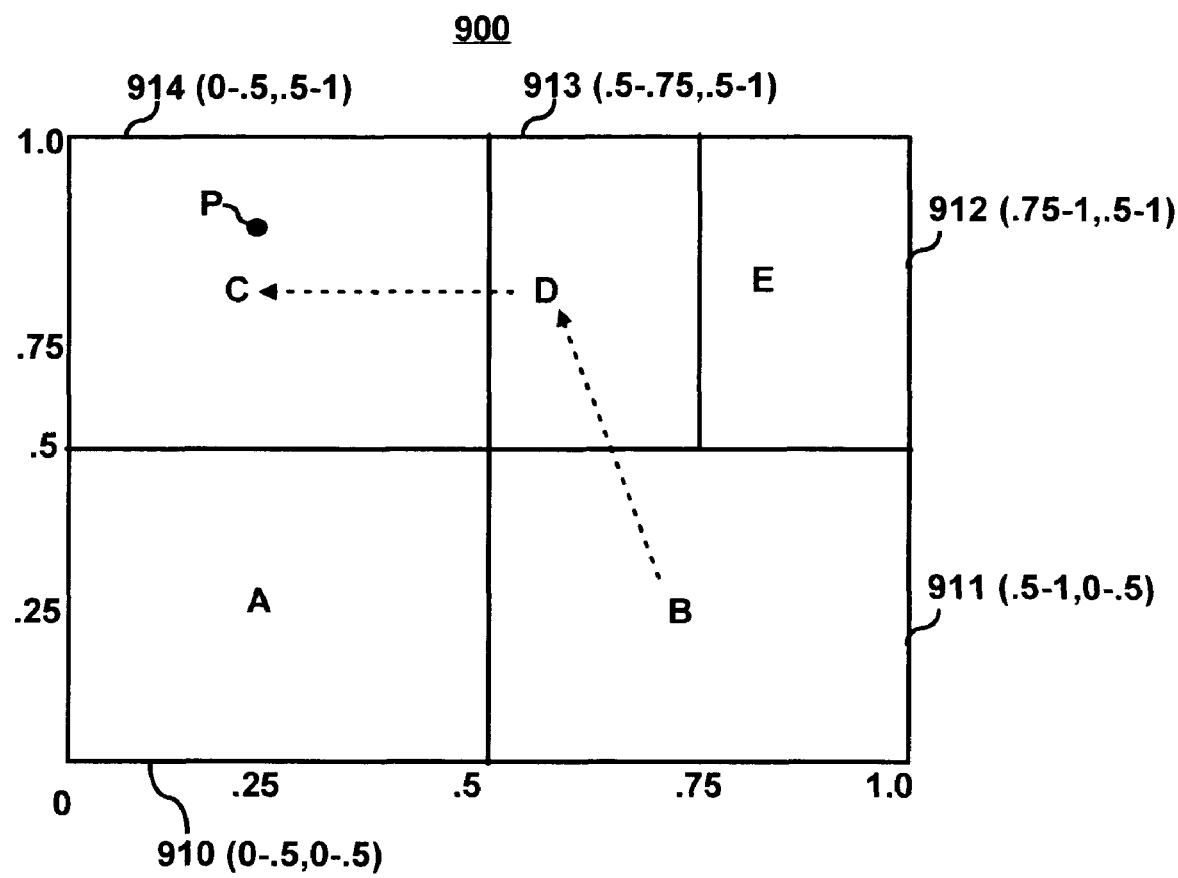
FIG. 9 illustrates a conventional CAN overlay network.
Figure 1:
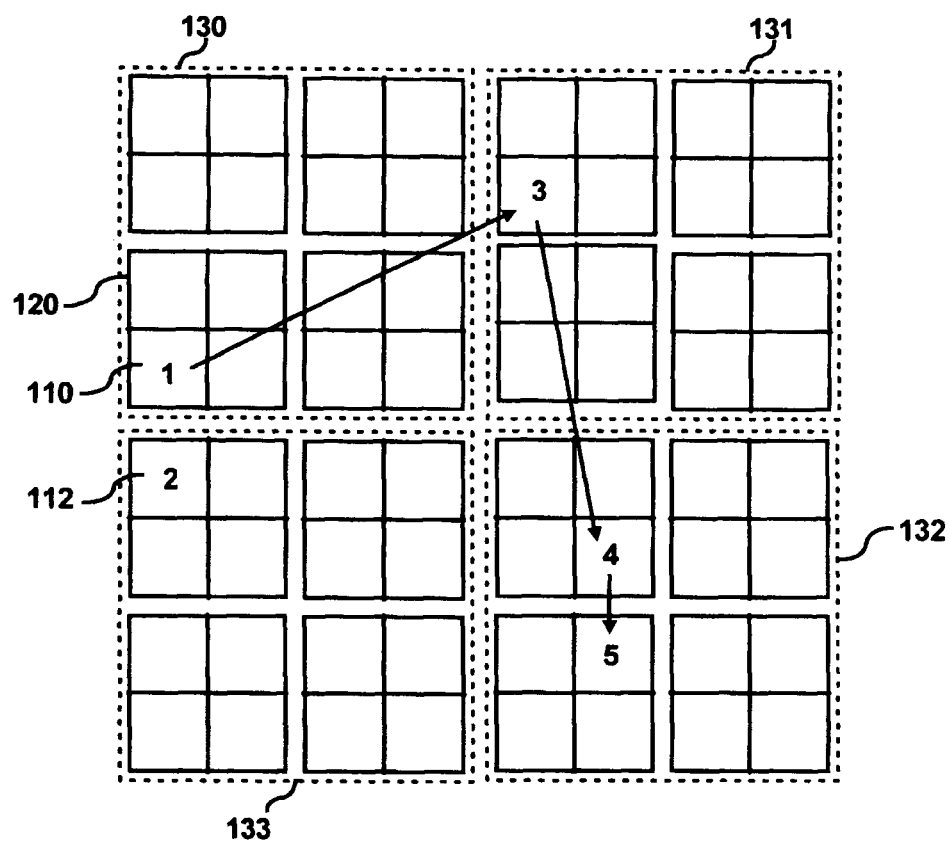

FIG. 8 illustrates an exemplary block diagram of a computer system 800 that may be used as a node in the network 700 shown in FIG. 7. The computer system 800 includes one or more processors, such as processor 802, providing an execution platform for implementing the methods 400-600. Many of the steps of the methods 400-600 may be implemented as software executed on the computer system 800. Commands and data from the processor 802 are communicated over a communication bus 804. The computer system 800 also includes a main memory 806, such as a Random Access Memory (RAM), where software may be executed during runtime, and a secondary memory 808. The secondary memory 808 includes, for example, a hard disk drive 810 and/or a removable storage drive 812, representing a floppy diskette drive, a magnetic tape drive, a compact disk drive, etc., or a nonvolatile memory where a copy of the software may be stored. Also, routing tables, maps, network conditions and measured network metrics may be stored in the main memory 806 and/or the secondary memory 808. The removable storage drive 812 reads from and/or writes to a removable storage unit 814 in a well-known manner. A user interfaces with the computer system 800 with a keyboard 816, a mouse 818, and a display 820. The display adaptor 822 interfaces with the communication bus 804 and the display 820 and receives display data from the processor 802 and converts the display data into display commands for the display 820. A network interface 830 is provided for communicating with other nodes via the network 720 shown in FIG. 7. Also, sensors 832 are provided for measuring network metrics for the node, which may include forward capacity, load, etc.

While the invention has been described with reference to the exemplary embodiments thereof, those skilled in the art will be able to make various modifications to the described embodiments without departing from the true spirit and scope. For example, it will be apparent to one of ordinary skill in the art that the advantages of storing proximity information as described herein can be applied to many applications, such as information storage, load balancing, congestion control, meeting quality of service (QoS) guarantee, taking advantage of heterogeneity in storage capacity and forwarding capacity, etc. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method of identifying a close-by node in a region of an overlay network, wherein the overlay network is a logical representation of a physical network, the method comprising:
   transmitting a map lookup request to a region of a plurality of regions in the overlay network, wherein each region has a different map, and wherein each map includes proximity information associated with locations of nodes in the region;
   receiving the map for the region for which the lookup request was sent;
   determining first proximity information associated with a location of a first node in the physical network;
   searching through the map received from the lookup request using the first proximity information;
   identifying a routing node in the region of the overlay network based on the searching through the map, wherein the routing node is a node in the region physically closest to the first node in the physical network relative to other nodes in the region.

2. The method of claim 1, wherein searching through a map associated with a region of the overlay network using the first proximity information, further comprises:
   comparing proximity information in the map associated with a plurality of nodes in the overlay network to the first proximity information to identify the node in the region physically closest to the first node in the physical network.

3. The method of claim 1, further comprising:
   storing routing information for the routing node in a routing table for the first node, such that messages transmitted to the region of the routing node are transmitted to the routing node in the region from the first node wherein the first node is located in another region in the overlay network.

4. The method of claim 3, wherein the overlay network is an expressway, content-addressable, overlay network, and the first node and the routing node are expressway routing nodes in the overlay network.

5. The method of claim 1, further comprising storing the map in nodes logically close in the overlay network, such that the proximity information in the map for the nodes physically close in the physical network is stored in the nodes logically close in the overlay network.

6. The method of claim 1, further comprising generating the proximity information for the map by performing steps of:
   selecting landmark nodes in the physical network;
   determining distances to the landmark nodes for the nodes in the overlay network;
   determining landmark vectors for the nodes in the overlay network based on the determined distances to the landmark nodes;
   mapping the landmark vectors to points in the region in the overlay network; and
   storing the landmark vectors at nodes associated with the points in the region as the proximity information for the map.

7. The method of claim 6, wherein selecting landmark nodes in the physical network comprises randomly selecting nodes in the physical network to be the landmark nodes.

8. The method of claim 6, wherein mapping the landmark vectors to points in the region in the overlay network further comprises:
   assigning landmark numbers to grids in a landmark space;
   identifying a grid of the grids where each landmark vector is located in the landmark space;
   assigning one of the landmark numbers to each of the landmark vectors based on the grid where the a respective landmark vector is located; and
   mapping the landmark numbers from the landmark space to the overlay network using a space filling curve, wherein the landmark space is an n-dimensional space and the overlay network is an m-dimensional space, and $n > m$.

9. The method of claim 1, further comprising:
   for each of the first node and the nodes in the region, identifying an overlay node based on the proximity information of the respective node; and
   for each of the first node and the nodes in the region, storing the proximity information in the respective overlay node, wherein nodes physically close based on their proximity information are stored in overlay nodes that are close in the overlay network.

10. The method of claim 9, further comprising:
    retrieving the map from the overlay node storing the proximity information for one or more of the nodes in the region.

11. A method of identifying a node in a region of an overlay network, wherein the overlay network is a logical representation of a physical network, the method comprising:
    transmitting a map lookup request to a region of a plurality of regions in the overlay network, wherein each region has a different map, and wherein each map includes proximity information associated with locations of nodes in the region;
    receiving the map for the region for which the lookup request was sent;
    determining first proximity information associated with a location of a first node in the physical network;
    searching through the map received from the lookup request using the first proximity information; and identifying a subset of nodes in the target region closest to the first node in the physical network based on the searching through the map.

12. The method of claim 11, further comprising:
determining distances from the source node to the subset of nodes; and
selecting from the subset of nodes a node closest to the source node in the physical network based on the determined distances.

13. The method of claim 12, further comprising:
entering the selected closest node in a routing table for the source node, wherein the selected closest node is used by the source node to route messages to the target region.

14. The method of claim 11, further comprising generating proximity information for nodes in the overlay network, the generated proximity information including the first proximity information and the proximity information for the map, wherein generating the proximity information comprises:
selecting landmark nodes in the physical network;
determining distances from a substantial number of nodes in the overlay network to the landmark nodes;
determining locations in the physical network for the substantial number of nodes based on the determined distances to the landmark nodes.

15. The method of claim 14, wherein the locations comprise landmark vectors for the substantial number of nodes, wherein the landmark vectors include components representing distances from each of the substantial number of nodes to each of the landmark nodes.

16. The method of claim 9, further comprising:
identifying a location of a node in the target region in the overlay network storing the map; and
transmitting a map lookup request to the node in the target region.

17. The method of claim 16, wherein identifying a location of a node in the target region storing the map further comprises hashing a landmark number associated with the target region using a hash function.

18. The method of claim 17, wherein the hash function comprises a space filling curve.

19. A node in an overlay network, wherein the overlay network is a logical representation of a physical network, the node comprising:
means for transmitting a map lookup request to a region of a plurality of regions in the overlay network, wherein each region has a different map, and wherein each map includes proximity information associated with locations of nodes in the region;
means for receiving the map for the region for which the lookup request was sent;
means for determining first proximity information associated with a location of the node in the network;
means for searching through the map received from the lookup request using the first proximity information; and
means for identifying a routing node in the region of the overlay network based on the searching through the map, wherein the routing node is a node in the region physically closest to the node relative to other nodes in the region.

20. The node of claim 19, wherein the node comprises means for storing routing information for the routing node in a routing table, such that messages transmitted to the region of the routing node are transmitted to the routing node.

21. The node of claim 19, further comprising:
means for storing the map for the region; and
means for updating the stored map in response to detecting predetermined changes to the network.

* * * * *

UNITED STATES PATENT AND TRADEMARK OFFICE
CERTIFICATE OF CORRECTION

| | | |
|---|---|---|
| PATENT NO. | : 7,788,400 B2 | |
| APPLICATION NO. | : 10/666621 | |
| DATED | : August 31, 2010 | |
| INVENTOR(S) | : Chunqiang Tang et al. | |

It is certified that error appears in the above-identified patent and that said Letters Patent is hereby corrected as shown below:

On the title page, item (75), Inventors, in column 1, line 1, delete "Chungtang Tang," and insert -- Chunqiang Tang, --, therefor.

In the drawings delete Sheet 1 of 11, in FIG. 1, add element number "100", above Figure. Replacement Sheet is attached herewith.

In the drawings delete Sheet 2 of 11, in FIG. 2A, add element number "200", above Figure. Replacement Sheet is attached herewith.

In column 14, line 33, in Claim 8, after "the" delete "a".

In column 14, line 47, in Claim 9, after "wherein" insert -- proximity information for --.

In column 14, line 48, in Claim 9, delete "information are" and insert -- information is --, therefor.

Signed and Sealed this
Twelfth Day of April, 2011

David J. Kappos
*Director of the United States Patent and Trademark Office*